Feb. 9, 1960      M. D. LISTON      2,924,713
INSTRUMENTS

Filed Jan. 18, 1956      2 Sheets-Sheet 1

INVENTOR.
MAX D. LISTON
BY
Pollard Johnston Smyth & Robertson
ATTORNEYS

Feb. 9, 1960   M. D. LISTON   2,924,713
INSTRUMENTS
Filed Jan. 18, 1956   2 Sheets-Sheet 2

INVENTOR.
MAX D. LISTON
BY
Pollard Johnston Smythe Robertson
ATTORNEYS

United States Patent Office 2,924,713
Patented Feb. 9, 1960

2,924,713

INSTRUMENTS

Max D. Liston, Darien, Conn., assignor to Beckman Instruments, Inc., Fullerton, Calif., a corporation of California Application January 18, 1956, Serial No. 559,950

13 Claims. (Cl. 250—43.5)

This invention relates to infrared analyzers and particularly the positive non-dispersion type.

In infrared analyzers wherein radiant energy is passed through a sample containing the unknown substance and then to a sensitive element or detector means, deterioration of the optical elements, dirt or corrosion, will result in errors. Another error is caused by interference due to gases other than the one to be determined having an absorption characteristic overlapping that of the gas of interest.

One of the objects of the present invention is to provide an analyzer which will tend to eliminate interference problems caused by substances having absorption in common with the unknown.

Another of the objects of the invention is to reduce the effects of changes of source emission and deterioration of the optical elements.

A still further object of the invention is to provide a method for adjusting an infrared analyzer.

In an instrument involving the present invention, radiant energy source means producing infrared can be arranged so that beams of rays therefrom pass through a sample containing the unknown material which may be liquid or gas, energy being absorbed by the unknown material. The beam of rays then is directed so as to impinge upon a pair of sensitive elements or detector means arranged in optical series relationship. In one form, each of the detector means preferably includes a variable capacitor means having plates movable relative to each other by changes of pressure of the gas or the body of material within the detector, said pressure being changed due to changes in the radiant energy reaching gas or material in the detector.

Each of the detector means may for example have a different charge of gas therein, the difference in the charge being a difference in the partial pressures of the gas of interest, or the charge in each detector being a different gas. A sample cell containing the unknown substance or gas to be determined is inserted in the path of rays to the detectors so that the radiant energy will pass in the same path therethrough before reaching the two detectors. Preferably, a means for modulating the incidence of the rays on the detectors is provided, for example, a rotating chopper or shutter arrangement periodically intercepting the rays.

In one form of the invention one beam of rays is used, the beam passing through the sample cell and then to the two detectors having different charges. In another form, two ray paths from the radiant energy source can be used, a sample cell containing the unknown substance being in one path and a reference cell being in the second path. The rays then pass to the two detectors.

The signals from the capacitors of the two detectors are applied to means responsive to the signal difference or their ratio. Variation in the sample substance to be detected affects mainly the response of one of the detectors only, whereas variations in an interfering substance, or in the source or optical characteristics of the system, affects the response of both detectors in nearly equal amount or proportion. Accordingly, by measuring the difference or ratio between the two signals, the effect of the interfering substance or optical variation is largely cancelled out. An example of such is in the analysis of isobutane in the presence of normal butane.

When the detectors are charged with the same gas, the gas employed is the same as that to be detected in the sample composition. The first detector is charged to a low partial pressure of the gas of interest and the second detector is charged to a higher partial pressure of the same gas. The response of the first detector results mainly from absorption in the wavelength regions of the principal absorption bands of the sample substance, i.e. the regions of high absorption. Any radiation in these regions not absorbed by the sample is substantially fully absorbed in the first detector. The second detector accordingly becomes sensitive to the side bands or regions closely adjacent to the regions of principal absorption by the sample substance. Thus, the two detectors produce signals characteristic of different wavelengths. The first detector signal varies sensitively with variations of the sample substance in the composition being analyzed, whereas the second detector signal tends to remain unchanged during such sample variations, hence acting in effect as a reference or comparison means. Both detectors are however affected in comparable or more nearly equal degree by variations in an interfering substance, or variations in source or optics. Hence by suitably combining the two signals the interfering effects may be substantially cancelled. This can be accomplished, for example, in a conventional ratio circuit, wherein the detector capacitors control the oscillations of two radio frequency tuned circuits.

In a further form, a servo-motor operated optical shutter can be arranged between the first and second detectors so as to establish a null balance between the signals. In one arrangement of such, two infrared beams are used, trimmer shutters being provided to adjust the arrangement, the servo operated shutter preferably being in the path of the measuring or sample cell beam, although it may be in the reference beam. The capacitors are connected in parallel reversed relationship so as to produce signals approximately 180° out of phase so that the signal from the second detector will tend to weaken the signal due to first detector. An error signal is produced which can be amplified and can be connected to a servo-motor operated shutter means between the detectors tending to or reestablishing balance. The servo-mechanism can be connected to an indicator or recorder which will give a measure of the amount of unknown present. The position of the shutter then becomes a function of the unknown present. The trimmer shutters and detectors can be adjusted in a sequence described hereafter.

In order to further eliminate interference problems, a filter charged with the interfering gas or material can be placed in the ray path, or the responses of the two detectors to the interfering gas can be equalized by charging the detector having the lesser response with the proper amount of the interfering gas.

These, and other objects, advantages and features of the invention will become apparent from the following description and drawings, which are merely exemplary.

Figure 1:
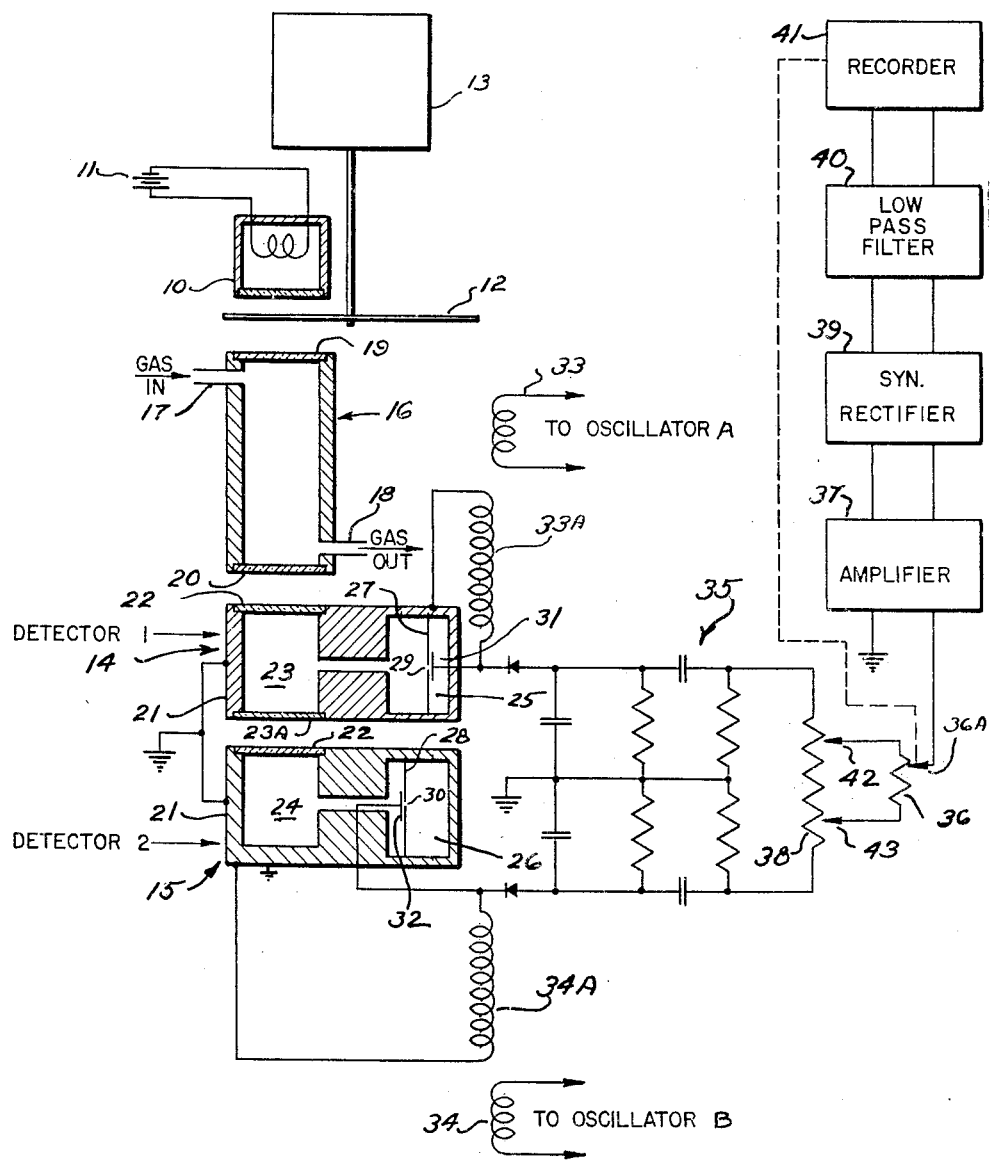
Fig. 1 is a schematic view of one form of the invention.

In the embodiment of the invention shown in Fig. 1 employing a single beam of rays, radiant energy source 10 is energized by a suitable source of electric current 11, said source 10 being arranged to produce radiant energy rays of the desired wave length, such as infrared. Opaque shutter 12 can be rotatably driven by a suitable motor 13 to intercept periodically the rays from the radiant energy source to modulate the incidence of the rays on the bodies of material or gas in sensitive elements or detectors 14, 15. Sample cell 16 is arranged so that the gas mixture with the unknown gas or material can be introduced through pipe 17 and exhausted through pipe 18, or vice-versa. Cell 16 may have windows 19, 20 of quartz or similar material selected so as to pass rays of wave lengths required for the determination of the unknown.

The structure of the sensitive elements or detectors 14 and 15 may be generally similar to those shown and described in Patent No. 2,698,390 or Patent No. 2,681,415. Briefly, each element may comprise a case or frame 21 having windows 22, 23A through which rays from the radiant energy source can pass. A gas or body of material can be located in chamber 23 of detector 14 and chamber 24 of detector 15. Chambers 23 and 24 are located in optical series relationship relative to radiant energy rays from source 10. Chambers 25 and 26 of detectors 14 and 15 respectively, are separated from chambers 23 and 24 respectively, by means of thin diaphragm plates 27 and 28 respectively. The thin diaphragm plates each may have a small aperture 29 and 30 therein for the purpose of permitting equalization of pressures between the chambers in each of the detectors.

The thin diaphragm plates 27, 28 each form one plate of a variable capacitor, plates 31, 32 being fixed relative to movable diaphragm plates 27, 28 respectively.

The variable capacitors of detectors 14 and 15 may have radio frequency energy connected thereto through suitable oscillators A and B connected to coils 33, 34 respectively, which are inductively coupled with coils 33A and 34A respectively. The fixed capacitor plates 31, 32 can be connected to a conventional ratio circuit 35, one form thereof being illustrated in Fig. 1. The error signal from ratio circuit 35 is connected to balancing or nulling resistor 36 which in turn is connected to amplifier 37. Scale adjusting resistance 38 can be provided having adjustable contactors 42, 43, for adjusting the scale or ratio. The amplifier can be connected through synchronizing rectifier 39 and low pass filter 40 to a suitable recorder 41. The rectifier 39 is synchronized with the chopper 12. The recorder in turn can have a mechanical connection to the adjustable contactor 36A of balancing or nulling resistor 36, said contactor being movable so as to rebalance the circuit to produce a true electrical null balance.

Describing operation of the arrangement of Fig. 1, shutter 12 will periodically intercept light passing from radiant energy source 10 through sample cell 16, the unknown in the gas or material in sample cell 16 absorbing energy. The rays then will pass through chamber 23 of detector 21 and chamber 24 of detector 22. Although detector 1 is charged with the gas of interest at a lesser pressure than detector 2, it absorbs virtually all the energy impinging on it in the high-absorptivity or principal absorption band regions. The unabsorbed energy in the side bands or regions of lesser absorption passes on to be absorbed in chamber 24 of the second detector 22. Thus, the first detector is adapted to absorb energy in a first wavelength region or regions where the sample substance is predominantly absorptive and the second detector is adapted to absorb energy in a closely adjoining wavelength region or regions. Interfering substances are generally not selectively absorptive with respect to these two adjoining wavelength regions, and so absorb energy more or less equally in both, hence their effect can be eliminated or greatly reduced by suitably combining the two detector signals. The absorption of energy in the two detector chambers will cause expansion of the gas therein, which in turn will result in movement of the diaphragm plates 27 and 28 of the variable capacitor arrangements. Movement thereof will produce signals which are fed to the ratio circuit 35, producing an error signal which is fed to the amplifier 37 and in turn to recorder 41. Recorder 41 will cause balancing resistor 36 to be rebalanced, the recorder thus giving an indication of the ratio and thus the unknown present.

Merely by way of example, if the unknown to be determined is isopropane and the different charge of gas in detectors 14, 15 is provided by different partial pressures, detector 14 can be charged with isopropane at a partial pressure of 15 mm. abs. and detector 15 with isopropane at a partial pressure of 100 mm. abs. Such an arrangement can be used to determine isopropane in normal propane with isopropane as an interfering element.

Where methanol is the unknown to be determined and different gases are to be used, detector 14 can be charged with methanol and detector 15 charged with ammonia. This will give a response to methanol in the parts per million range eliminating false responses to water vapor found present in some non-dispersion analyzers.

Figure 2:
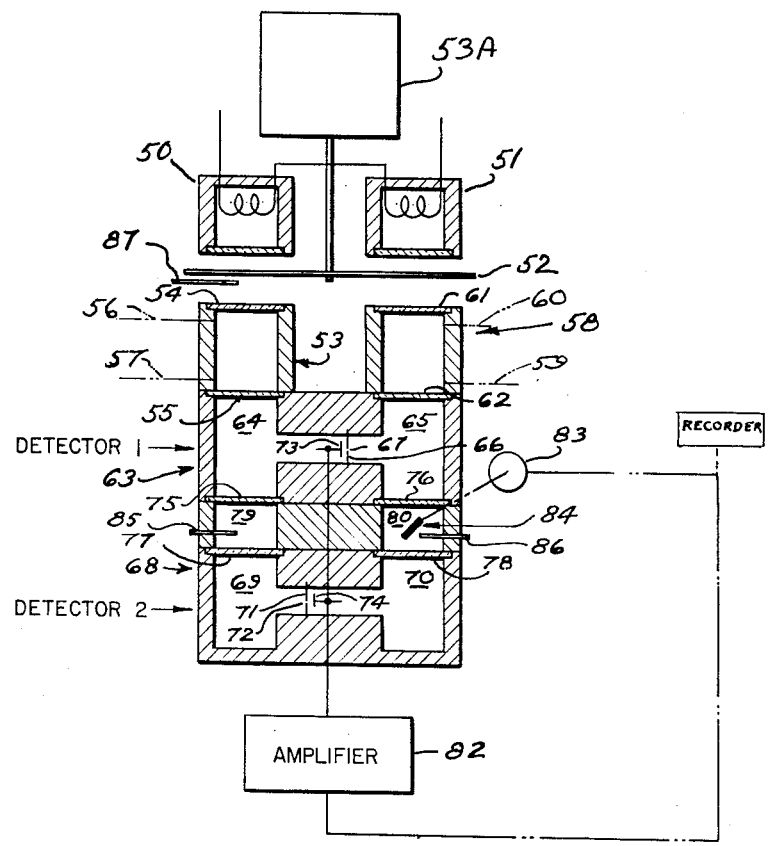
Fig. 2 is a schematic view of another form of the invention.

Another form of the invention is shown in Fig. 2, wherein two paths of rays from the source of radiant energy are employed. The sources of radiant energy 50, 51 are energized by a suitable source of electric current. Light chopper 52 or means to modulate incidence of light on the detectors is driven by a suitable motor 53A, the light chopper periodically and simultaneously interrupting or intercepting light from the radiant energy sources 50 and 51. The reference beam is passed through reference cell 53 having windows 54, 55 at either end thereof, the windows being of quartz or of a material selected to pass radiant energy of the desired wave length. The interior of reference cell 53 may be filled through pipes 56, 57 with a suitable gas. Sample cell 58 may have gas containing the unknown admitted thereto through pipe 59 and exhausted through pipe 60 or vice-versa. Sample cell 58 has suitable windows 61, 62 at either end thereof.

The first detector 63 has chamber 64 and chamber 65, the chambers being separated by a thin diaphragm plate 66 having a small aperture 67 therein as in Fig. 1. The second detector 68, which is in optical series relationship with the first detector 63, has chambers 69 and 70 separated by the thin diaphragm plate 71, with an aperture 72 therein. Fixed plates 73, 74 are located in close proximity to thin diaphragm plates 66 and 72 to form a variable capacitor therewith. The volumes of the chambers are suitably related as desired.

In the first detector 63, windows 55 and 62 at the ends of the reference cell and sample cell respectively may close chambers 64 and 66, or separate windows may be used. At the other end of chambers 64 and 65, windows 75, 76 are located. Chambers 69 and 70 of the second detector 68 have windows 77 and 78. In the space 79 and 80 between the first detector 63 and the second detector 68, suitable trimmer shutters 85 and 86 are provided to attenuate the beams passing to the second detector. The movable diaphragm plate of the capacitor in the first detector 63 is reversed relative to the second detector 68 so that it will produce a signal 180° out of phase. The capacitor diaphragms are connected in parallel with each other to amplifier 82. Any unbalance will produce an error signal which in turn is amplified and connected in the usual manner to a servo positioning device schematically indicated at 83. The shutter position is effectively a measure of the ratio of the energy absorbed in the first detector chamber 65 to that available for absorption in the second detector chamber 70. Hence the shutter position is a measure of the sample substance to be measured to the substantial exclusion of the interfering substance, and is independent of source variation or variation in the properties of the optical elements. The shutter can be connected to an indicator or recorder arrangement. Preferably, the servo positioning device 83 is such as to assume a position proportional to the signal from the amplifier 82. In this case, the recorder may be directly electrically connected to the amplifier output as shown.

In adjustment, the reference cell beam first is blocked off, the measuring cell beam being activated. Shutter 86 then is adjusted so that the signal from the first detector exactly cancels the signal from the second detector when there is no unknown in cell 58 and the servomechanism 83 is in a zero position. When in this condition, the zero or span adjustment is not affected by changes in emission of the source 51 or changes in the transmission of cell 58. Since the sensitivity of the detectors themselves may change with temperature or other effects, it is sometimes desirable to compensate by using a second or reference beam as shown in Fig. 2. In adjusting the reference beam, the connection to the second detector is removed from the amplifier, so only the first detector is activated. Shutter 87 is adjusted until no signal is received from the first detector with both beams operating, there being no material in the sample and reference cells. The connection to the amplifier is then shifted to the second detector and shutter 85 is adjusted in a similar manner.

The instrument has been found to be insensitive to the variation in source 50 or 51 and is compensated for variations in detector sensitivity.

It is to be understood that details of construction and operation may be varied without departing from the spirit of the invention except as defined in the appended claims.

What is claimed is:

1. The method of adjusting an infrared analyzer having a source of radiant energy producing two beams, a reference cell, a sample cell, each of said cells having one of said beams passing therethrough, two detectors having different gas charges, said detectors being in optical series relation, said detectors having variable sensing capacity means connected to an electric circuit, and a servo operated optical attenuation shutter interposed between the first and second detector in one of said beams, comprising the steps of activating the sample cell beam only and adjusting the attenuation of radiant energy between the first and second detectors such that the signal from the second detector cancels the signal from the first detector, then activating the first detector only with both beams activated and adjusting radiant energy in the reference cell beam so that the signal from the first detector is zero, and then activating the second detector only and adjusting attenuation between the first and second detectors so that the signal from the second detector becomes zero.

2. In a positive-type infrared analyzer for measuring a component in a composition in the presence of an interferent having an absorption characteristic overlapping that of said component, the combination including radiant energy source means, means containing said composition in the path of rays from said radiant energy source, two infrared-absorptive detector means in optical series relationship relative to said rays, one of said detector means being adapted to absorb in wavelength regions where both said component and said interferent are relatively strongly absorptive and providing a first electrical signal responsive to variations of both said component and said interferent, the other of said detector means being adapted to absorb in a wavelength region where said interferent is relatively more strongly absorptive than said component and giving a second electrical signal preferentially responsive to variations of said interferent, and means for combining said signals for compensating the effect of said interferent on the response of said one detector and for producing an output signal selectively indicative of said component.

3. In a positive-type infrared analyzer for measuring a component in a composition in the presence of an interferent having an absorption characteristic overlapping that of said component, the combination including radiant energy source means, means containing said composition in the path of rays from said radiant energy source, two infrared-absorptive detector means in optical series relationship relative to said rays, each of said detector means having capacitor means for producing signals, one of said detector means being adapted to absorb in wavelength regions where both said component and said interferent are relatively strongly absorptive and providing a first electrical signal responsive to variations of both said component and said interferent, the other of said detector means being adapted to absorb in a wavelength region where said interferent is relatively more strongly absorptive than said component and giving a second electrical signal preferentially responsive to variations of said interferent, and means for combining said signals for compensating the effect of said interferent on the response of said one detector and for producing an output signal selectively indicative of said component.

4. In a positive-type infrared analyzer for measuring a component in a composition in the presence of an interferent having an absorption characteristic overlapping that of said component, the combination including radiant energy source means, means containing said composition in the path of rays from said radiant energy source, two infrared-absorptive detector means in optical series relationship relative to said rays and having the component being measured therein, each of said detector means having capacitor means for producing signals, the first of said detector means traversed by said rays having said component at a relatively low pressure and being absorptive in wavelength regions where both said component and said interferent are relatively strongly absorptive and providing a first electrical signal responsive to variations of both said component and said interferent, the second of said detector means traversed by said rays having said component at a relatively higher pressure and being responsive in a wavelength region where said interferent is relatively more strongly absorptive than said component and being adapted to give a second electrical signal preferentially responsive to variations of said interferent, and means for combining said signals for compensating the effect of said interferent on the response of said one detector and for producing an output signal selectively indicative of said component.

5. In a positive-type infrared analyzer for measuring a component in a composition in the presence of an interferent having an absorption characteristic overlapping that of said component, the combination including radiant energy source means, means containing said composition in the path of rays from said radiant energy source, two infrared-absorptive detector means in optical series relationship relative to said rays, one of said detector means being adapted to absorb in wavelength regions where both said component and said interferent are relatively strongly absorptive and providing a first electrical signal responsive to variations of both said component and said interferent, the other of said detector means being adapted to absorb in a wavelength region where said interferent is relatively more strongly absorptive than said component and giving a second electrical signal preferentially responsive to variations of said interferent, and means for combining said signals for compensating the effect of said interferent on the response of said one detector and for producing an output signal which is the function of the difference between said first and second signals.

6. In a positive-type infrared analyzer for measuring a component in a composition in the presence of an interferent having an absorption characteristic overlapping that of said component, the combination including radiant energy source means, means containing said composition in the path of rays from said radiant energy source, two infrared-absorptive detector means in optical series relationship relative to said rays, one of said detector means being adapted to absorb in wavelength regions where both said component and said interferent are relatively strongly absorptive and providing a first electrical signal responsive to variations of both said component and said interferent, the other of said detector means being adapted to absorb in a wavelength region where said interferent is relatively more strongly absorptive than said component and giving a second electrical signal preferentially responsive to variations of said interferent, and means for combining said signals for compensating the effect of said interferent on the response of said one detector and for producing an output signal which is the function of the ratio of said first and second signals.

7. In a positive-type infrared analyzer for measuring a component in a composition in the presence of an interferent having an absorption characteristic overlapping that of said component, the combination including radiant energy source means, means containing said composition in the path of rays from said radiant energy source, two infrared-absorptive detector means in optical series relationship relative to said rays, one of said detector means being adapted to absorb in wavelength regions where both said component and said interferent are relatively strongly absorptive and providing a first electrical signal responsive to variations of both said component and said interferent, the other of said detector means being adapted to absorb in a wavelength region where said interferent is relatively more strongly absorptive than said component and giving a second electrical signal preferentially responsive to variations of said interferent, means modulating the intensity of said rays impinging on said detector means so as to cyclically vary said signals, and means for combining said signals in opposed phase relationship and for producing a combined output signal selectively indicative of said component, and servomechanism means responsive to said combined signal for adjusting the relative magnitudes of said first and second signals for indicating the amount of said component as a function of the adjustment of said relative magnitude.

8. In a positive-type infrared analyzer for measuring a component in a composition in the presence of an interferent having an absorption characteristic overlapping that of said component, the combination including radiant energy source means, means containing said composition in the path of rays from said radiant energy source means, first and second infrared-absorptive detector chamber means in optical series relationship relative to said rays, one of said detector chamber means being adapted to absorb in wavelength regions where both said component and said interferent are relatively strongly absorptive and being responsive to variations both of said component and said interferent, the other of said detector chamber means being adapted to absorb in a wavelength region where said interferent is relatively more strongly absorptive than said component and to respond preferentially to variations of said interferent, and optical attenuator means adjustably positioned in said path between said chamber means for adjusting the relative response of said detector chamber means whereby the position of said attenuator means is indicative of the quantity of said component in said composition.

9. In a positive-type infrared analyzer for measuring a component in a composition in the presence of an interferent having an absorption characteristic overlapping that of said component, the combination including radiant energy source means, means containing said composition in the path of rays from said radiant energy source means, first and second infrared-absorptive detector chamber means in optical series relationship relative to said rays, one of said detector chamber means being adapted to absorb in wavelength regions where both said component and said interferent are relatively strongly absorptive and being responsive to variations both of said component and said interferent, the other of said detector chamber means being adapted to absorb in a wavelength region where said interferent is relatively more strongly absorptive than said component and to respond preferentially to variations of said interferent, optical attenuator means adjustably positioned in said path between said chamber means for adjusting the relative response of said detector chamber means, and positioning servomechanism means responsive to a difference in response between said detector chamber means for positioning said attenuator means to adjust said responses to be substantially equal, whereby the position assumed by said attenuator means is indicative of the concentration of said component in said composition.

10. In a positive-type infrared analyzer for measuring a component in a composition in the presence of an interferent having an absorption characteristic overlapping that of said component, the combination including radiant energy source means providing two beams of rays, means containing said composition in the path of one of said beams, the other of said beams comprising a reference path, two infrared-absorptive detector means in optical series relationship to each other, each of said detector means having two absorption chambers respectively positioned in said two beams and producing an output signal as a function of the difference in the energies absorbed in the two chambers, the chambers of one of said detector means being charged with a substance absorptive in wavelength regions where both said component and said interferent are relatively strongly absorptive and giving a first electrical signal responsive to variations both of said component and said interferent, the chambers of the other of said detector means being adapted to absorb in a wavelength region where said interferent is relatively more strongly absorptive than said component and giving a second signal preferentially responsive to variations of said interferent, and means for combining said signals to compensate for the effect of said interferent on the response of said one of said detector means and to produce an output signal selectively indicative of said component.

11. In a positive-type infrared analyzer for measuring a component in a composition in the presence of an interferent having an absorption characteristic overlapping that of said component, the combination including radiant energy source means, means containing said composition in the path of rays from said radiant energy source, two infrared-absorptive detector means in optical series relationship relative to said rays, one of said detector means being charged with a quantity of said component being measured, the other of said detector means being charged with a different substance selected to be absorptive in wavelength regions where said interferent is absorptive and minimally absorptive in wavelength regions where said component is absorptive, said one of said detector means providing a first electrical signal, the other of said detector means being adapted to give a second electrical signal, and means for combining said signals for compensating the effect of said interferent on the response of said one detector and for producing an output signal selectively indicative of said component.

12. In a positive-type infrared analyzer for measuring a component in a composition in the presence of an interferent having an absorption characteristic overlapping that of said component, the combination including radiant energy source means, means containing said composition in the path of rays from said radiant energy source means, two infrared-absorptive capacitive detector means in optical series relationship relative to said rays, one of said detector means being adapted to absorb in wavelength regions where both said component and said interferent are relatively strongly absorptive and giving a first electrical signal responsive to variations of both said component and said interferent, the other of said detector means being adapted to absorb in a wavelength region where said interferent is relatively more strongly absorptive than said component and giving a second signal preferentially responsive to variations of said interferent, means modulating the incidence of said rays on both said detector means, and means connecting said signals in opposed phase relationship, recording servomechanism means for continuously adjusting said signals so that they will be substantially equal, said servomechanism means being responsive to an error signal comprising the difference between the signals from said detector means, said recording servomechanism continuously recording the magnitude of said adjustment as a measure of said component of said composition.

13. In a positive-type of infrared analyzer for measuring a component in a composition in the presence of an interferent having an absorption characteristic overlapping that of said component, the combination including radiant energy source means providing two beams of rays, means containing said composition in the path of one of said beams, the other of said beams comprising a reference path, two infrared-absorptive detector means in optical series relationship to each other, each of said detector means having two absorption chambers respectively positioned in said two beams and being adapted to produce an output signal as a function of the difference in the energies absorbed in the two chambers, the chambers of one of said detector means being charged with a substance absorptive in wavelength regions where both said component and said interferent are relatively strongly absorptive and giving a first electrical signal responsive to variations both of the said component and said interferent, the other of said detector means being adapted to absorb in a wavelength region where said interferent is relatively more strongly absorptive than said component and giving a second signal preferentially responsive to variations of said interferent, means connecting the respective outputs of said detector means in opposed relationship to give a difference signal, amplifier means for amplifying said difference signal, attenuator means positioned between said detector means in said beam containing said sample composition, a positioning device responsive to the output of said amplifier for adjusting said attenuator means to reduce said difference signal substantially to zero, and recorder means responsive to the output of said amplifier for recording the amount of said component in said composition.

References Cited in the file of this patent

UNITED STATES PATENTS

| | | |
|---|---|---|
| 2,736,813 | Cherrier | Feb. 28, 1956 |
| 2,758,216 | Luft | Aug. 17, 1956 |
| 2,834,247 | Pickels | May 13, 1958 |

FOREIGN PATENTS

| | | |
|---|---|---|
| 645,576 | Great Britain | Nov. 1, 1950 |